United States Patent
Huag et al.

(10) Patent No.: US 9,188,164 B2
(45) Date of Patent: *Nov. 17, 2015

(54) BEARING FAILURE MONITORING DEVICE FOR BALL SCREW

(71) Applicant: Hiwin Technologies Corp., Taichung (TW)

(72) Inventors: Fu-Chun Huag, Taichung (TW); Yih-Chyun Hwang, Taichung (TW); Chun-Lin Yu, Taichung (TW)

(73) Assignee: Hiwin Technologies Corp., Situn, Taichung (TW)

( * ) Notice: Subject to any disclaimer, the term of this patent is extended or adjusted under 35 U.S.C. 154(b) by 42 days.

This patent is subject to a terminal disclaimer.

(21) Appl. No.: 14/087,529

(22) Filed: Nov. 22, 2013

(65) Prior Publication Data

US 2015/0147007 A1    May 28, 2015

(51) Int. Cl.

| | |
|---|---|
| *F16H 25/20* | (2006.01) |
| *F16H 57/01* | (2012.01) |
| *G01K 13/08* | (2006.01) |
| *F16C 41/00* | (2006.01) |
| *F16C 29/06* | (2006.01) |
| *G01M 13/02* | (2006.01) |
| *F16H 25/22* | (2006.01) |

(52) U.S. Cl.
CPC ........... *F16C 41/007* (2013.01); *F16C 29/0685* (2013.01); *F16H 25/2214* (2013.01); *F16H 57/01* (2013.01); *G01M 13/02* (2013.01); *F16H 2057/012* (2013.01)

(58) Field of Classification Search
CPC ................ F16H 25/2214; F16H 57/01; F16H 2057/012; F16H 25/20; F16H 25/2204; F16H 25/2021; G01K 13/08; Y10T 74/19772; Y10T 74/19753; Y10T 74/19763; Y10T 74/19758; Y10T 74/19777; Y10T 74/19702; Y10T 74/19744

USPC ............... 74/424.71, 424.81, 424.82, 424.83, 74/424.87, 424.88, 424.7, 89.23, 89.36; 384/9, 43–45, 48, 446; 700/56, 58; 374/163

See application file for complete search history.

(56) References Cited

U.S. PATENT DOCUMENTS

| | | | |
|---|---|---|---|
| 4,414,863 | A | 11/1983 | Heino |
| 5,193,409 | A * | 3/1993 | Babinski ..................... 74/424.83 |
| 5,779,367 | A * | 7/1998 | Obara ................................ 384/8 |
| 6,759,963 | B2 * | 7/2004 | Hayes ............................ 340/584 |
| 6,882,142 | B2 * | 4/2005 | Koike et al. .................... 324/174 |
| 7,273,134 | B2 * | 9/2007 | Schack et al. ................. 188/72.8 |
| 7,299,703 | B2 | 11/2007 | Balasu et al. |
| 7,523,682 | B2 | 4/2009 | Liao et al. |
| 2006/0045406 | A1 | 3/2006 | Iwamoto et al. |
| 2008/0190230 | A1 * | 8/2008 | Liao et al. ................... 74/424.83 |
| 2008/0257080 | A1 * | 10/2008 | Singh ............................ 74/89.23 |

(Continued)

*Primary Examiner* — William Kelleher
*Assistant Examiner* — Jude Agendia
(74) *Attorney, Agent, or Firm* — Charles E. Baxley

(57) ABSTRACT

A linear motion guide device includes a movable member attached onto an elongated member for forming an endless multiple-turn, helical raceway between the elongated member and the movable member and for receiving ball bearing members, and a detecting device includes a magnetic member and an integrated circuit disposed in the movable member and arranged close to the endless multiple-turn, helical raceway for detecting a moving frequency or a movement of the ball bearing members through the endless multiple-turn, helical raceway of the linear motion guide device and for detecting a wear or failure of the ball bearing members and for generating a warning signal.

12 Claims, 4 Drawing Sheets

(56) References Cited

U.S. PATENT DOCUMENTS

| | | | |
|---|---|---|---|
| 2009/0071278 A1* | 3/2009 | Chiu et al. | 74/424.82 |
| 2010/0170360 A1* | 7/2010 | Chen et al. | 74/424.84 |
| 2011/0096808 A1* | 4/2011 | Hwang et al. | 374/141 |
| 2012/0014631 A1* | 1/2012 | Huang et al. | 384/446 |
| 2012/0137808 A1* | 6/2012 | Chen et al. | 74/424.88 |

* cited by examiner

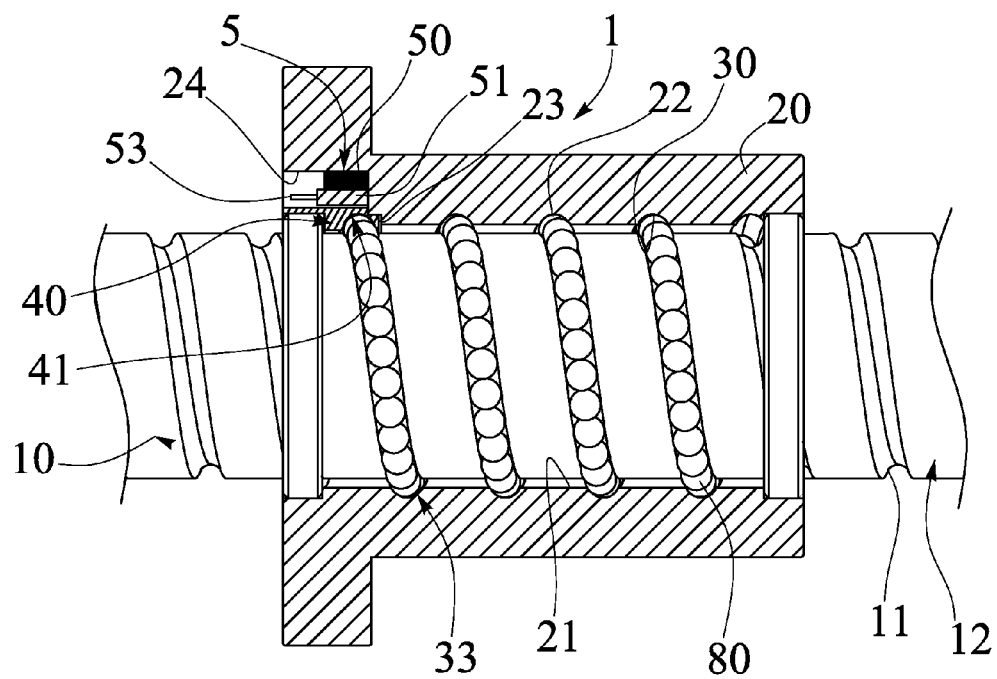
F I G. 1
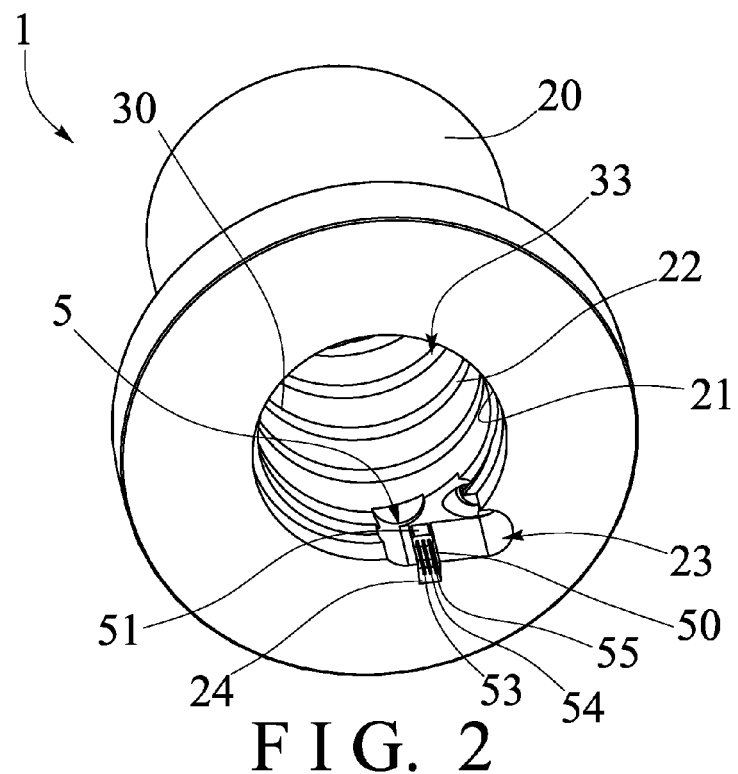
F I G. 2

BEARING FAILURE MONITORING DEVICE FOR BALL SCREW

The present invention is a continuation-in-part of U.S. patent application Ser. No. 12/804,073, filed 13 Jul. 2010, pending and to be abandoned.

BACKGROUND OF THE INVENTION

1. Field of the Invention

The present invention relates to a ball screw device or a linear motion guide device having a bearing failure monitoring device, and more particularly to a ball screw device or a linear motion guide device having a bearing failure monitoring device for sensing or detecting a wear or failure of the ball bearing members and for generating a warning signal.

2. Description of the Prior Art

Typical ball screw devices or linear motion guide devices comprise a ball nut or sliding member slidably attached or mounted onto an elongated member or screw shaft, and having helical ball guiding passages formed therein for forming or defining an endless multiple-turn, helical raceway therein, and a number of ball bearing members engaged in the endless multiple-turn, helical raceway for facilitating the sliding movement between the elongated member or screw shaft and the ball nut or sliding member.

Normally, the elongated member or screw shaft and the ball nut or sliding member may be slid or moved in a great speed relative to each other, and the ball bearing members may have a good chance to become wear or failure after use, and the typical ball screw devices or linear motion guide devices may also become failure after use.

For example, U.S. Pat. No. 7,523,682 to Liao et al. discloses one of the typical linear motion guide devices including an arrangement for smoothly guiding two sliding members to slide relative to each other. However, Liao et al. failed to teach an integrated circuit disposed for detecting a moving frequency between the two sliding members, particularly when the typical linear motion guide devices have become wear or damaged or failure after use.

U.S. Pat. No. 4,414,863 to Heino, and U.S. Pat. No. 7,299,703 to Balasu et al. disclose the other typical bearing balls escape and wear annunciator arrangements for ball screws including an arrangement for detecting a load bearing failure and including a pair of electrical sensors installed on a load path that is threadedly engaged with the screw shaft, and the electrical sensors are required to be engaged into the helical threaded portions or grooves of the screw shaft in order to detect the load bearing failure.

However, it will be difficult to install or dispose or attach or mount the electrical sensors into the load path, and the electrical sensors may not be used to suitably or effectively sense or detect the wear or failure of the ball bearing members due to the filling or engagement of the grease or lubricating oil in the endless multiple-turn, helical raceway that receives the ball bearing members.

U.S. Patent Publication No. 2006/0045406 to Iwamoto et al. discloses a further typical linear motion guide device including a detecting device having a magnetic member and an integrated circuit disposed for detecting a moving frequency that communicates with nearby component for the purposes of installing sensors compactly in a bearing assembly while detecting the target component in a stable manner.

Actually, in Iwamoto et al., a sensor-equipped wheel support bearing assembly is disclosed and includes rotation sensors installed in compact in the bearing assembly for detecting, in a stable fashion, the number of revolutions of the vehicle wheel and the load acting on the vehicle wheel.

However, in Iwamoto et al., the rotation sensors are installed in the bearing assembly for detecting the number of revolutions of the vehicle wheel and the load acting on the vehicle wheel, and a number of displacement sensor assemblies are further required and disposed at respective locations circumferentially equidistantly spaced from each other, and the rotation sensor is positioned between the displacement sensors for detecting the number of revolutions of the vehicle wheel and the load acting on the vehicle wheel, but may not be used for detecting whether the typical linear motion guide device has become failure or not.

The present invention has arisen to mitigate and/or obviate the afore-described disadvantages of the conventional bearing failure monitoring devices for ball screw devices or linear motion guide devices.

SUMMARY OF THE INVENTION

The primary objective of the present invention is to provide a ball screw device or a linear motion guide device including a bearing failure monitoring device for easily and readily sensing or detecting a wear or failure of the ball bearing members and for generating a warning signal.

In accordance with one aspect of the invention, there is provided a linear motion guide device comprising an elongated member including a helical threaded groove formed on an outer peripheral surface thereof, a movable member including a bore formed therein for receiving the elongated member and for movably attaching onto the elongated member, and including a helical threaded groove formed therein and aligned with the helical threaded groove of the elongated member for forming a ball guiding passage between the elongated member and the movable member, the movable member including a depression formed therein and communicating with the helical threaded groove and the ball guiding passage of the movable member, and the movable member including a compartment formed therein and communicating with the depression of the movable member, a deflecting device attached to the depression of the movable member and including a deflecting pathway formed therein and communicating with the ball guiding passage and the helical threaded groove of the movable member for forming an endless multiple-turn, helical raceway between the elongated member and the movable member, a number of ball bearing members disposed in the endless multiple-turn, helical raceway that is formed between the elongated member and the movable member for facilitating a sliding movement between the elongated member and the movable member, and a detecting device including a magnetic member and an integrated circuit disposed and secured into the compartment of the movable member, and arranged close to the endless multiple-turn, helical raceway of the linear motion guide device for detecting a moving frequency of the ball bearing members through the endless multiple-turn, helical raceway of the linear motion guide device, and the integrated circuit of the detecting device being disposed for a spacing distance smaller than 15 mm from the ball bearing members, and including a first terminal and a second terminal coupled to a power supply, and a third terminal coupled to a processing device.

The magnetic member is selected from a permanent magnetic member, or selected from an electrico-magnetic member. The ball bearing members are disposed between the magnetic member and the integrated circuit of the detecting device.

The processing device includes a frequency counter and a comparator; or includes a frequency counter and an operator; or includes a frequency counter and a comparator and an operator; or includes a micro processor.

The detecting device includes a relay and a warning device coupled to the processing device; or includes an encoder and a display coupled to the processing device.

The integrated circuit of the detecting device is disposed between the magnetic member and the ball bearing members. The magnetic member is disposed between the integrated circuit of the detecting device and the ball bearing members.

Further objectives and advantages of the present invention will become apparent from a careful reading of the detailed description provided hereinbelow, with appropriate reference to the accompanying drawings.

BRIEF DESCRIPTION OF THE DRAWINGS

FIG. 1 is a partial cross sectional view of a ball screw device or a linear motion guide device including a bearing failure monitoring device in accordance with the present invention;

FIG. 2 is a partial perspective view of a ball nut for attaching or mounting the bearing failure monitoring device;

DETAILED DESCRIPTION OF THE PREFERRED EMBODIMENT

Figure 3:
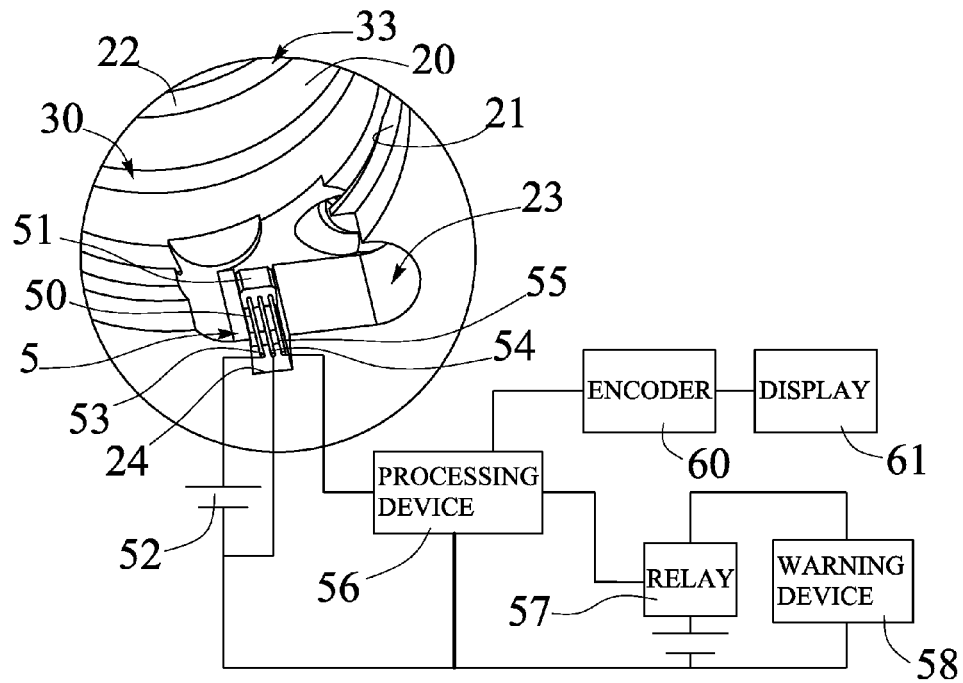
FIG. 3 is a partial plan schematic view illustrating the electric circuit of the bearing failure monitoring device.

Referring to the drawings, and initially to FIGS. 1-3, a linear motion guide device 1 in accordance with the present invention comprises an elongated bolt or screw shaft or member 10 including a helical threaded portion or groove 11 formed on the outer peripheral portion thereof, or formed in the outer peripheral surface 12 thereof, and a movable member 20, such as a ball nut 20 including a screw hole or bore 21 formed therein for receiving or engaging with the elongated screw shaft or member 10 and for movably attaching or mounting onto the elongated screw shaft or member 10, and the screw hole or bore 21 of the ball nut 20 is formed or defined by a helical threaded portion or groove 22 which is formed in the inner peripheral portion of the ball nut 20.

The helical threaded portion or groove 11 of the screw shaft or member 10 is aligned with the helical threaded portion or groove 22 of the ball nut 20 for forming or defining a ball guiding passage 30 between the screw shaft 10 and the ball nut 20, and the ball nut 20 includes one or more depressions 23 formed therein and arranged and intersected or communicated with the helical threaded portion or groove 22 or the ball guiding passage 30 of the ball nut 20 for receiving or attaching or engaging with deflecting devices 40 which are attached or mounted or secured to the depressions 23 of the ball nut 20 and each of which includes a deflecting pathway 41 formed therein and aligned with or communicating with the ball guiding passage 30 of the ball nut 20 for forming or defining a single endless multiple-turn, helical raceway 33 and for slidably receiving a number of ball bearing members 80 and for facilitating the sliding or rotational movement between the elongated bolt or screw shaft or member 10 and the movable member or ball nut 20.

The ball nut 20 further includes a cavity or recess or compartment 24 formed therein and preferably, but not necessarily communicating with the depression 23 of the movable member or ball nut 20 for receiving or engaging with a detecting device 5. For example, the detecting device 5 includes a magnetic member 50 and an integrated circuit (Hall IC) 51 disposed or attached or mounted or secured into the compartment 24 of the ball nut 20 with such as adhesive materials, latches or fasteners (not shown), in which the attachment or securing of the magnetic member 50 and the integrated circuit (Hall IC) 51 of the detecting device 5 into the compartment 24 of the ball nut 20 is not related to the present invention and will not be described in further details. The magnetic member 50 may be selected from a permanent magnetic member 50 or an electrico-magnetic member 50. The IC 51 and/or magnetic member 50 of the detecting device 5 are thus disposed or arranged close to or beside the endless multiple-turn, helical raceway 33 of the linear motion guide device 1 for detecting the moving frequency or the movement of the ball bearing members 80 through the endless multiple-turn, helical raceway 33 of the linear motion guide device 1.

The detecting device 5 further includes a battery or power supply 52 having different poles coupled to the two legs or feet or terminals 53, 54 of the IC 51, and the IC 51 further includes another leg or foot or terminal 55 coupled to a processing device 56 which may be selected from a micro processor; a frequency counter and a comparator; a frequency counter and an operator; or a frequency counter and a comparator and an operator; or the like, for receiving the signals from the IC 51 and for treating or controlling or operating or processing the signals from the IC 51, and a relay 57 is coupled to the processing device 56, and a warning device 58 is coupled to the relay 57 and the battery or power supply 52 and may be selected from a light member or buzzer (not shown) for generating a warning signal, such as a warning light or a warning sound.

As shown in FIGS. 1-5, the IC 51 and/or magnetic member 50 of the detecting device 5 may be used to detect the moving frequency of the ball bearing members 80 bypass or through the place or position where the IC 51 and/or magnetic member 50 of the detecting device 5 are located; i.e., to detect the moving frequency of the ball bearing members 80 through the endless multiple-turn, helical raceway 33 of the linear motion guide device 1, and to send the detected frequencies or signals to the processing device 56, and the processing device 56 may then compare the detected frequencies or signals with a predetermined frequency or signal or value, and may actuate the relay 57 to operate the warning device 58 and to generate the warning signal, such as the warning light or the warning sound when the detected frequencies or signals are greater or lower then or different from the predetermined frequency or signal or value, or when the ball bearing members 80 have been worn out or become failure or escaped.

Figure 4:
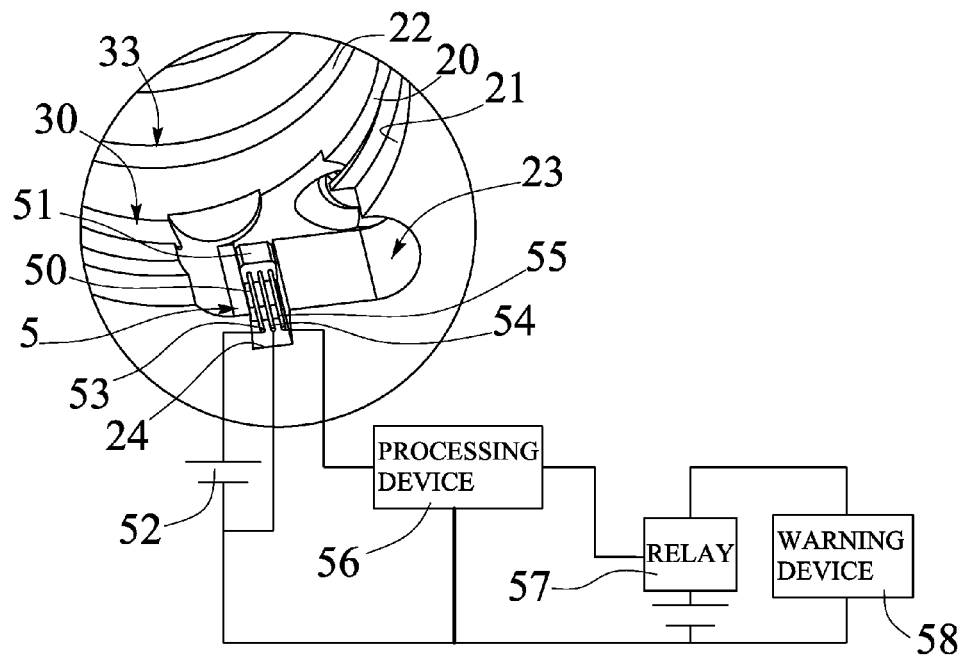
FIG. 4 is a partial plan schematic view similar to FIG. 3 illustrating the other arrangement of the bearing failure monitoring device.

As shown in FIG. 3, the linear motion guide device 1 may further include an encoder 60 and a display 61 connected or coupled to the processing device 56, and the processing device 56 may actuate the encoder 60 to encode the detected frequencies or signals or the worn out or failure or escape signals into digital signals, and then to operate the display 61 to display the digital signals and to show the status of the ball bearing members 80. It is to be noted that, as shown in FIG. 3, the encoder 60 and the display 61 may be optionally provided and connected or coupled to the processing device 56 for signal showing or displaying purposes, or alternatively, as shown in FIG. 4, the encoder 60 and the display 61 may be selectively or optionally removed or disconnected from the processing device 56.

Figure 5:
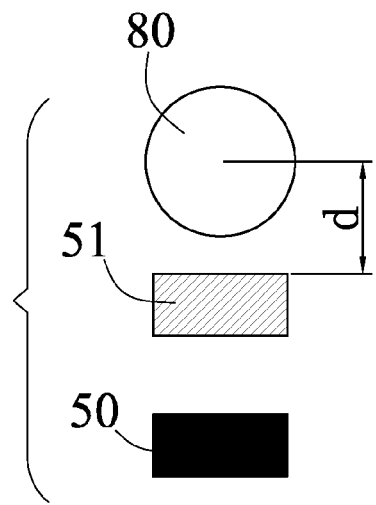
FIG. 5 is a plan schematic view illustrating the arrangement of the parts of the bearing failure monitoring device.
Figure 8:
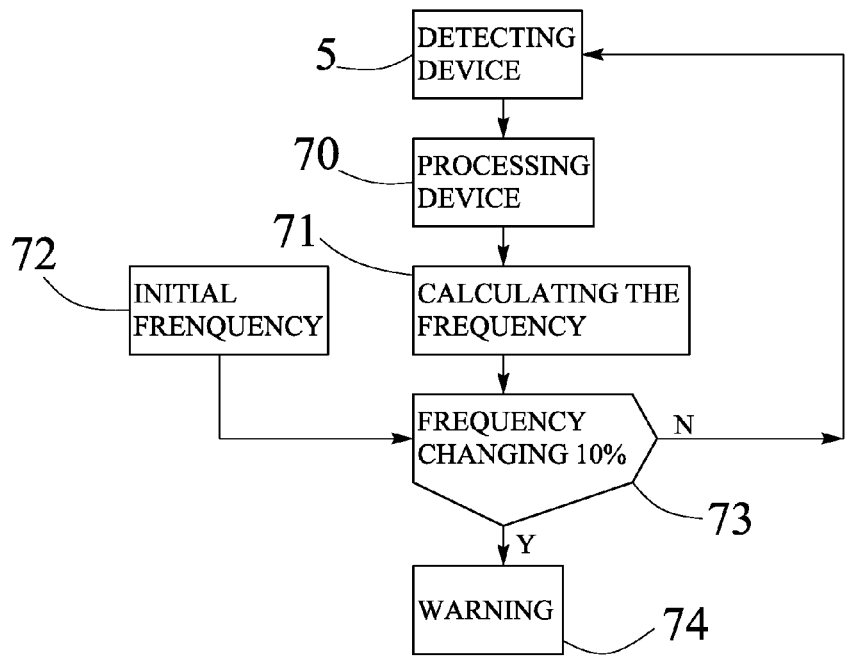
FIG. 8 is a flow chart illustrating the operation of the bearing failure monitoring device.

In operation, as shown in FIGS. 1-4, the movement of the ball bearing members 80 through the endless multiple-turn, helical raceway 33 of the linear motion guide device 1, or bypass or through the place or position where the IC 51 and/or magnetic member 50 of the detecting device 5 may be suitably detected by the IC 51 and/or magnetic member 50 of the detecting device 5 (FIG. 8). As shown in FIG. 5, the IC 51 may be selectively disposed or attached or mounted between the magnetic member 50 and the ball bearing members 80, and it is preferable that the spacing distance "d" between the IC 51 and the ball bearing members 80 is smaller than 15 mm for allowing the IC 51 to suitably detect the moving frequency or the movement of the ball bearing members 80 through the endless multiple-turn, helical raceway 33 of the linear motion guide device 1.

Figure 6:
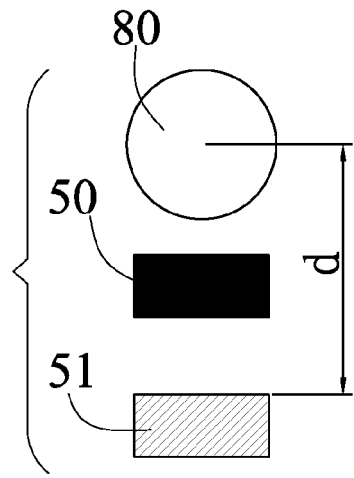
FIGS. 6, 7 are plan schematic views similar to FIG. 5 illustrating the further arrangement of the parts of the bearing failure monitoring device.
Figure 7:
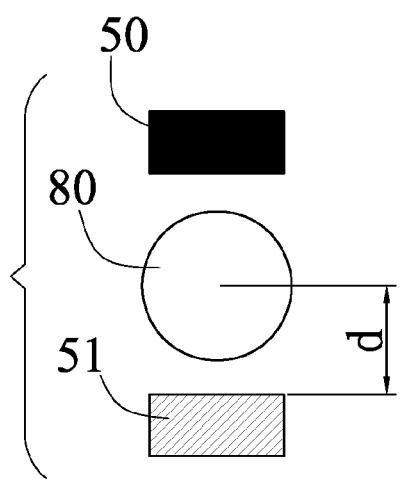

Alternatively, as shown in FIG. 6, the magnetic member 50 may also be selectively disposed or attached or mounted between the IC 51 and the ball bearing members 80, and it is also preferable that the distance "d" between the IC 51 and the ball bearing members 80 is also smaller than 15 mm. Further alternatively, as shown in FIG. 7, the ball bearing members 80 may also be selectively disposed or attached or mounted between the IC 51 and the magnetic member 50, and it is also preferable that the distance "d" between the IC 51 and the ball bearing members 80 is also smaller than 15 mm for allowing the IC 51 to suitably detect the moving frequency or the movement of the ball bearing members 80 through the endless multiple-turn, helical raceway 33 of the linear motion guide device 1.

It is to be noted that the IC 51 and the magnetic member 50 of the detecting device 5 are disposed or attached or mounted or engaged in the compartment 24 that is deeply formed in the movable member or ball nut 20 and communicating with the depression 23 of the movable member or ball nut 20, such that the IC 51 and the magnetic member 50 of the detecting device 5 are not required to be engaged into the helical threaded portions or grooves 11 of the screw shaft or member 10, and may be easily and quickly disposed or attached or mounted or engaged into the compartment 24 of the movable member or ball nut 20.

As shown in FIG. 8, after receiving the signals from the detecting device 5, the processing device 56 may treat or control or operate or process the signals from the processing device 56 in the process 70, and then may calculate the moving frequency of the ball bearing members 80 through the endless multiple-turn, helical raceway 33 of the linear motion guide device 1 in the process 71, the processing device 56 is memorized or stored with an initial or predetermined or pre-calculated moving frequency 72 of the ball bearing members 80 through the endless multiple-turn, helical raceway 33 of the linear motion guide device 1, and then may compare, in the process 73, the initial or predetermined or pre-calculated moving frequency 72 of the ball bearing members 80 with the newly calculated moving frequency 72 of the ball bearing members 80 in the process 71.

Figure 9:
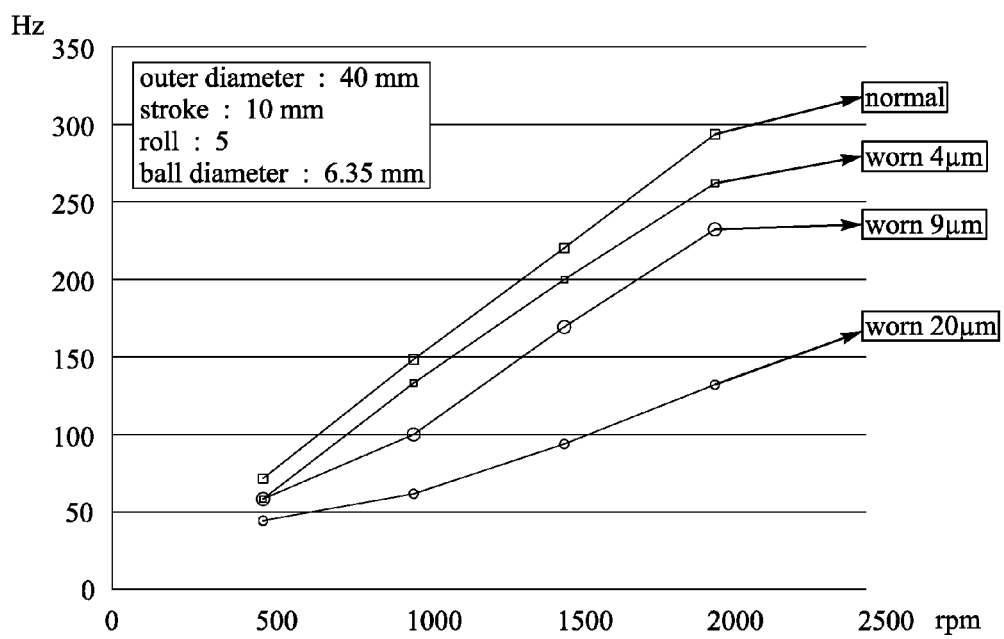
FIG. 9 is a diagram illustrating the detected result of the bearing failure monitoring device.

If the varying or changing of the moving frequency 72 of the ball bearing members 80 does not exceed 10%, the detecting device 5 will keep detecting the moving frequency or the movement of the ball bearing members 80 through the endless multiple-turn, helical raceway 33 of the linear motion guide device 1. On the contrary, when the varying or changing of the moving frequency 72 of the ball bearing members 80 exceeds 10%, the warning device 58 may be actuated or operated to generate a warning signal, such as a warning light or a warning sound, in order to warn the user that the moving frequency or the movement of the ball bearing members 80 has problem or has become wear or damaged or failure after use, and thus for allowing the user to examine and to repair the linear motion guide device 1 when required. As shown in FIG. 9, the moving frequency of the ball bearing members 80 may be lowered when the wearing of the linear motion guide device 1 has become greater and greater.

Accordingly, the ball screw device or a linear motion guide device in accordance with the present invention includes a bearing failure monitoring device for easily and readily sensing or detecting a wear or failure of the ball bearing members and for generating a warning signal.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

We claim:

1. A linear motion guide device comprising:
an elongated member including a helical threaded groove formed on an outer peripheral surface thereof,
a movable member including a bore formed therein for receiving said elongated member and for movably attaching onto said elongated member, and including a helical threaded groove formed therein and aligned with said helical threaded groove of said elongated member for forming a ball guiding passage between said elongated member and said movable member, said movable member including a depression formed therein and communicating with said helical threaded groove and said ball guiding passage of said movable member, and said movable member including a compartment formed therein and communicating with said depression of said movable member,
a deflecting device attached to said depression of said movable member and including a deflecting pathway formed therein and communicating with said ball guiding passage and said helical threaded groove of said movable member for forming an endless multiple-turn, helical raceway between said elongated member and said movable member,
a plurality of ball bearing members disposed in said endless multiple-turn, helical raceway that is formed between said elongated member and said movable member for facilitating a sliding movement between said elongated member and said movable member, and
a detecting device including a magnetic member and an integrated circuit disposed and secured into said compartment of said movable member, and arranged close to said endless multiple-turn, helical raceway of said linear motion guide device for detecting a moving frequency of said ball bearing members through said endless multiple-turn, helical raceway of said linear motion guide device, and said integrated circuit of said detecting device being disposed for a spacing distance smaller than 15 mm from said ball bearing members, and including a first terminal and a second terminal coupled to a power supply, and a third terminal coupled to a processing device.

2. The linear motion guide device as claimed in claim 1, wherein said magnetic member is selected from a permanent magnetic member.

3. The linear motion guide device as claimed in claim 1, wherein said magnetic member is selected from an electrico-magnetic member.

4. The linear motion guide device as claimed in claim 1, wherein said processing device includes a frequency counter and a comparator.

5. The linear motion guide device as claimed in claim 1, wherein said processing device includes a frequency counter and an operator.

6. The linear motion guide device as claimed in claim 1, wherein said processing device includes a frequency counter and a-comparator and an operator.

7. The linear motion guide device as claimed in claim 1, wherein said processing device includes a micro processor.

8. The linear motion guide device as claimed in claim 1, wherein said detecting device includes a relay and a warning device coupled to said processing device.

9. The linear motion guide device as claimed in claim 1, wherein said detecting device includes an encoder and a display coupled to said processing device.

10. The linear motion guide device as claimed in claim 1, wherein said integrated circuit of said detecting device is disposed between said magnetic member and said ball bearing members.

11. The linear motion guide device as claimed in claim 1, wherein said magnetic member of said detecting device is disposed between said integrated circuit of said detecting device and said ball bearing members.

12. The linear motion guide device as claimed in claim 1, wherein said ball bearing members are disposed between said magnetic member and said integrated circuit of said detecting device.

* * * * *